US012502643B2

(12) United States Patent
Ferreira Do Nascimento et al.

(10) Patent No.: US 12,502,643 B2
(45) Date of Patent: Dec. 23, 2025

(54) HIGH-PRESSURE VESSEL FOR PACKAGING HOLLOW FIBER TYPE MEMBRANES FOR THE SEPARATION PROCESS WITH CONTACTORS

(71) Applicants: PETRÓLEO BRASILEIRO S.A.—PETROBRAS, Rio de Janeiro (BR); UNIVERSIDADE FEDERAL DO RIO DE JANEIRO, Rio de Janeiro (BR)

(72) Inventors: Jailton Ferreira Do Nascimento, Rio de Janeiro (BR); Cristiano Piacsek Borges, Rio de Janeiro (BR); Nicolas Roger Jean-Daniel Mermier, Rio de Janeiro (BR)

(73) Assignees: PETRÓLEO BRASILEIRO S.A.—PETROBRAS, Rio de Janeiro (BR); UNIVERSIDADE FEDERAL DO RIO DE JANEIRO, Rio de Janeiro (BR)

(*) Notice: Subject to any disclaimer, the term of this patent is extended or adjusted under 35 U.S.C. 154(b) by 882 days.

(21) Appl. No.: 17/779,929

(22) PCT Filed: Nov. 11, 2020

(86) PCT No.: PCT/BR2020/050477
§ 371 (c)(1),
(2) Date: May 25, 2022

(87) PCT Pub. No.: WO2021/102535
PCT Pub. Date: Jun. 3, 2021

(65) Prior Publication Data
US 2023/0001357 A1    Jan. 5, 2023

(30) Foreign Application Priority Data
Nov. 26, 2019 (BR) ............... 10 2019 024938 2

(51) Int. Cl.
*B01D 63/02* (2006.01)
*B01D 63/04* (2006.01)

(52) U.S. Cl.
CPC .......... *B01D 63/022* (2013.01); *B01D 63/04* (2013.01); *B01D 2313/025* (2013.01);
(Continued)

(58) Field of Classification Search
CPC ................. B01D 63/022; B01D 63/04; B01D 2313/025; B01D 2313/04;
(Continued)

(56) References Cited

U.S. PATENT DOCUMENTS

| | | |
|---|---|---|
| 8,506,685 B2 | 8/2013 | Taylor et al. |
| 8,540,876 B2 | 9/2013 | Poklop et al. |
| 9,339,768 B2 | 5/2016 | Taylor |

FOREIGN PATENT DOCUMENTS

| | | |
|---|---|---|
| EP | 2 104 552 B1 | 11/2007 |
| EP | 1 864 709 A2 | 12/2007 |

OTHER PUBLICATIONS

International Search Report for PCT/BR2020/050477 dated Jan. 28, 2021 (PCT/ISA/210).

*Primary Examiner* — Thuan D Dang
(74) *Attorney, Agent, or Firm* — Sughrue Mion, PLLC

(57) ABSTRACT

The present invention addresses to a high-pressure vessel for packaging hollow fiber type membranes with application in the field of separation process with contactors with membranes aiming at a compact device/piece of equipment configured for the packaging of hollow fiber type bundles that can be used for various fluid separation processes such as liquid-liquid, liquid-gas and gas-gas, capable of working at high-pressures, enabling adequate hydrodynamic conditions and easily scalable. It is called a module the general piece of equipment, consisting of the vessel (A or C), object (Continued)

of the present invention, and the membranes packed inside the vessel. This piece of equipment consists of a vessel inside which the membranes are placed (14), and two heads attached at the ends (B or D). Each head has two connection points, thus allowing this device to be used with membrane contactors-type separation systems, such as "classical" permeation systems (liquid-liquid, gas-gas, pervaporation).

9 Claims, 3 Drawing Sheets

(52) U.S. Cl.
CPC .. *B01D 2313/041* (2022.08); *B01D 2313/042* (2022.08); *B01D 2313/13* (2013.01); *B01D 2313/2011* (2022.08); *B01D 2313/21* (2013.01)

(58) Field of Classification Search
CPC .......... B01D 2313/042; B01D 2313/13; B01D 2313/2011; B01D 2313/21; B01D 61/002; B01D 61/364; B01D 2315/22
See application file for complete search history.

C-D

HIGH-PRESSURE VESSEL FOR PACKAGING HOLLOW FIBER TYPE MEMBRANES FOR THE SEPARATION PROCESS WITH CONTACTORS

CROSS REFERENCE TO RELATED APPLICATIONS

This application is a National Stage of International Application No. PCT/BR2020/050477 filed Nov. 17, 2020, claiming priority based on Brazilian Patent Application No. 10 2019 024938 2 filed Nov. 26, 2019.

FIELD OF THE INVENTION

The present invention addresses to a high-pressure vessel for packaging hollow fiber type membranes with application in the field of separation process by contactors with membranes aiming at a compact device/piece of equipment configured for the packaging of hollow fiber type bundles that can be used for different fluid separation processes such as liquid-liquid, liquid-gas and gas-gas, capable of working at high-pressures, enabling adequate hydrodynamic conditions and easily scalable.

DESCRIPTION OF THE STATE OF THE ART

Currently, hollow fiber/capillary modules present a central body/vessel closed by two heads at the ends. One or two "Tee" (T) type connections are usually connected to the vessel/central part of the module to allow the supply/recovery of the other streams, depending on the direction of permeation. These modules/housings were later adapted for separation processes using liquid-liquid or gas-liquid membrane contactors, by modifying the heads and/or coupling other connections/parts to the central vessel/tube. As seen in U.S. Pat. No. 5,211,728A, which discloses a hollow fiber membrane device, comprising a hollow fiber membrane bundle with tubesheets, separable end caps, clamshell-shaped retainers for joining end caps to tubesheets, associated circumferential protectors that constrain in position the clamshell and envelope retainers that enclose the membrane bundle. It is used to separate one or more fluids from one or more other fluids in a fluid mixture, wherein the fluids have different transport rates across membranes. The fluids can be in a gaseous, vapor or liquid state. Such a patent discloses a different construction, and does not disclose the special features presented in the present invention, where it presents a compact device/piece of equipment configured for the packaging of hollow fiber type bundles. The assembly, called a module, can be used for different fluid separation processes such as liquid-liquid, liquid-gas and gas-gas. Unlike patent U.S. Pat. No. 5,211,728A, the device, simple and versatile, consists of few pieces/parts (heads and central vessel), considerably reducing the number of points susceptible to leakage. The way of attachment, whether threaded for small modules or flanged for medium-sized or industrial modules, is considerably facilitated in relation to the half-moon type clamps presented in the device of U.S. Pat. No. 5,211,728A. The heads are directly attached to the central vessel, inside which the bundle is packed/glued, thus eliminating the use of such clamps or other metallic connections/parts. The access of the fluids in the lumen of the fibers happens axially, while the access in the shell of the membranes is distributed homogeneously, radially to the bundle, compared to the U.S. Pat. No. 5,211,728A, thus eliminating/reducing the possible undesirable preferential paths inside the module. Fluid dynamics is also considerably favored.

Patent PI0512225-2B1 presents a device used in a particular application of immersed type such as membrane bioreactors, for example. This type of process is applied for treatment/separation of liquid medium in a permeation mode with "negative" pressure from the external part to the internal part of the hollow fibers. The head is specially configured for this type of application. It presents a central access to a pressurized gaseous medium responsible for the injection of air bubbles into the internal part of the bundle that allows the reduction of scaling along the fibers. This device does not have a closed pressure vessel. The attachment head located at the base of the bundle is not designed to be used in other separation processes such as membrane contactors, for example.

Document US2003024868A1 presents a spiral-type module typically used in the seawater desalination process, for example, also known as reverse osmosis. The module configuration presents flat polymeric membranes rolled up and attached in a perforated central tube used as a permeate collector. This configuration cannot be applied to contactors with membranes type modules as described in the present invention. This type of module is preferably used/suitable for separation processes of liquid streams that are already pre-treated or with a low content of suspended particles/solids. Fluid dynamics is not particularly favored in this type of module.

In order to solve such problems, the present invention was developed, by designing a vessel with a compact configuration to facilitate the packaging of hollow fiber type membranes, allowing the vessel to be removed/reused several times. The set of this piece of equipment (vessel, heads) does not have other connections (type "Tee"—T), thus reducing the points susceptible to leakage. This piece of equipment is designed to withstand pressures up to 200 bar (20 MPa). The connections of the different lines/streams are made directly on the side of the heads, longitudinally to the vessel body, thus reducing the physical space of the piece of equipment within the system. This piece of equipment presents two easily scalable configurations. The configuration of the cavity and the access holes for the external part of the membranes (shell) consequently reduces the radial mechanical impact of the stream (in particular in the case of a liquid) on the bundle of the hollow fibers. The adhesion of the membranes to the vessel body is performed by gluing in a specially designed region with a surface with specific roughness to control the adhesion force.

BRIEF DESCRIPTION OF THE INVENTION

The present invention addresses to a device/piece of equipment that allows the packaging of polymeric hollow fiber/capillary type membranes used in membrane separation processes. It is called a module, the general piece of equipment, consisting of the vessel, object of the present invention, and the membranes packed inside the vessel. This piece of equipment consists of a vessel inside which the membranes are placed, and two heads attached at the ends. Each head has two connection points, thus allowing this device to be used with membrane contactors-type separation systems, such as "classical" permeation systems (liquid-liquid, gas-gas, pervaporation).

BRIEF DESCRIPTION OF DRAWINGS

The present invention will be described in more detail below, with reference to the attached figures that, in a schematic way and not limiting the inventive scope, represent examples of its embodiment. In the drawings, there are.

DETAILED DESCRIPTION OF THE INVENTION

The present invention refers to a device/piece of equipment that allows the packaging of the type of polymeric hollow fibers/capillaries used in membrane separation processes. It is called module, the general piece of equipment, consisting of the vessel, object of the present invention, and the membranes packed inside the vessel. This piece of equipment consists of a vessel inside which the membranes are placed, and two heads attached at the ends. Each head has two connection points, thus allowing the use of this device with membrane contactors-type separation systems, such as "classic" permeation systems (liquid-liquid, gas-gas, pervaporation). This invention presents two types of configuration according to the present invention and illustrated according to FIGS. 1 to 10.

Figure 1:
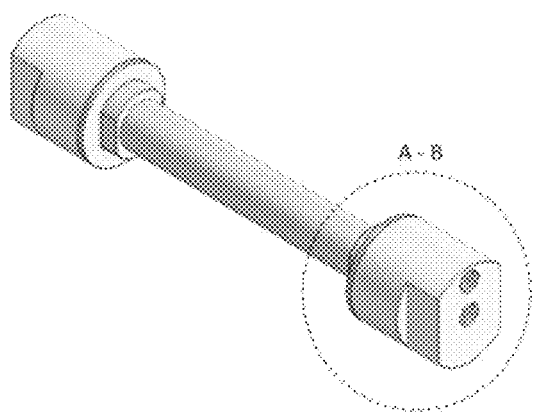
FIG. 1 illustrating the complete device/piece of equipment with the A-B threaded configuration.
Figure 2:
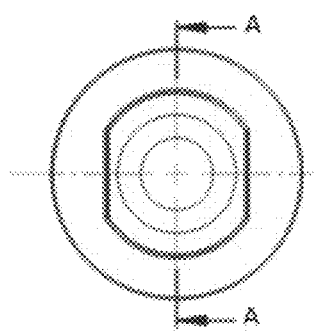
FIG. 2 illustrating the side view of the body of vessel A.
Figure 3:
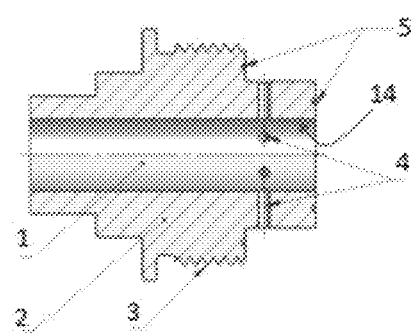
FIG. 3 illustrating the cross/longitudinal section A-A of the ends of the vessel body.
Figure 4:
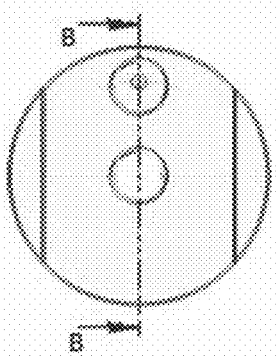
FIG. 4 illustrating the longitudinal side view of the threaded head B.
Figure 5:
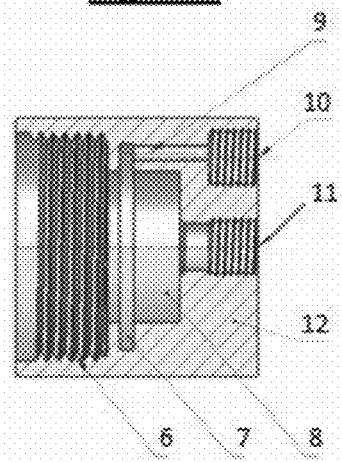
FIG. 5 illustrating the cross/longitudinal section B-B of the threaded type head.

FIGS. 1 to 5 represent the vessel with the threaded type configuration. FIG. 1 represents the vessel (A) and the heads (B) presenting threaded connections. FIG. 2 shows the side view of the vessel body (A). FIG. 3 shows the cross/longitudinal section of the ends of the vessel body, where it presents two annular channels (5) that allow the accommodation of two rubber sealing rings of the "O-rings" or gasket type at each end. When threaded/joined to the vessel, the head (B) compresses the sealing rings, ensuring strength at high-pressures. FIG. 4 shows a section B-B of the side view of the head. FIG. 5 represents the cross/longitudinal section B-B of the head, where the eccentric connection (10) corresponds to the outlet/inlet (9) of the line circulating through the shell of the hollow fiber membranes, while the central connection (11) corresponds to the outlet/inlet of the line/stream circulating through the lumen of hollow fiber membranes. The volume of glue inserted into the module must be previously determined so as not to close the holes (4) for accessing the stream circulating through the membrane shell (14). This configuration is suitable for modules having an internal section (1) up to 1" (inch) (2.54 cm) in diameter (1).

Figure 6:
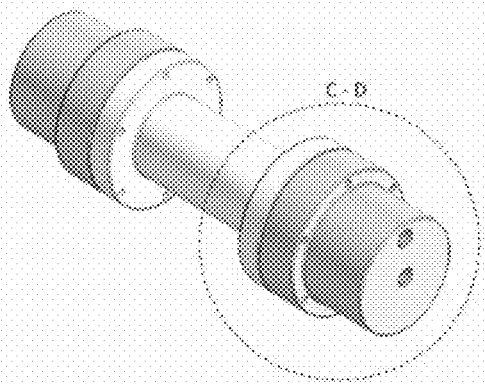
FIG. 6 illustrating the complete device/piece of equipment with the C-D flange type configuration.
Figure 7:
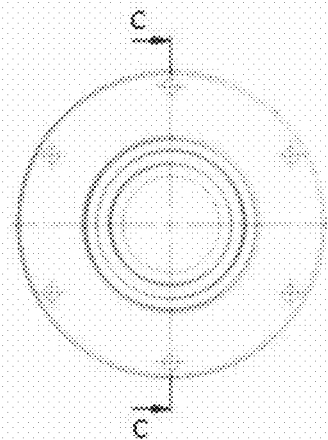
FIG. 7 illustrating the longitudinal side view of vessel body C.
Figure 8:
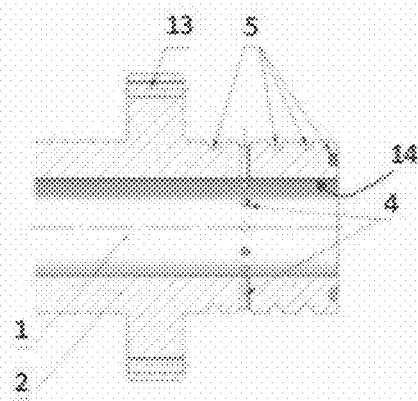
FIG. 8 illustrating the cross/longitudinal section C-C of the ends of the vessel body.
Figure 9:
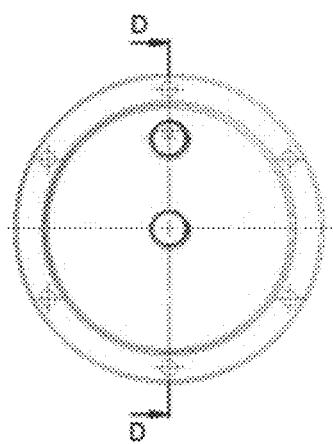
FIG. 9 illustrating the side view of the flange head D.
Figure 10:
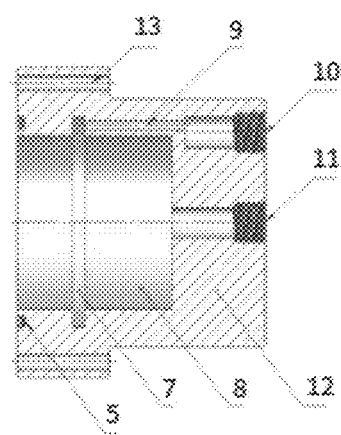
FIG. 10 illustrating the cross/longitudinal section D-D of the flange-type head.

FIGS. 6 to 10 represent the vessel with the flange-type configuration. As can be seen in FIG. 6, the ends of the vessel (C) as well as the heads were designed with flange-type connections (D). FIG. 7 shows the side view (C) of the vessel body. FIG. 8 represents the cross/longitudinal section C-C of the ends of the vessel body with four annular grooves (5) located in the vessel body and one in the head allowing the accommodation of O-ring or gasket type sealing rings at each end. FIG. 9 shows the side view (D) of the flange-type head. FIG. 10 represents the cross/longitudinal section D-D of the flange-type head, where the eccentric connection (10) corresponds to the outlet/inlet of the line/stream circulating through the lumen of the hollow fiber membranes, while the central connection (11) corresponds to outlet/inlet of the line/stream circulating through the lumen of hollow fiber membranes. The volume of glue inserted into the module must be previously determined so as not to close the holes (4) for the stream/line to access circulating through the shell of the membranes. This configuration is suitable for modules having an internal section (1) greater than 1" (inch) (2.54 cm) in diameter (8).

The housing body (2), the head thread (3), the detail of the thread (6), the internal channel of the head corresponding to the circulation of the line/stream passing through the shell of the membranes (7), the part (8), cylinder head body (12), flange bolt hole (13) are also shown in FIGS. 1 to 10.

The invention claimed is:

1. A high-pressure vessel for packaging at least one hollow fiber type membrane for a separation process with membrane contactors, the high-pressure vessel comprising:
   a vessel body; and
   a head configured to be connected to the vessel body,
   wherein the vessel body comprises:
      an internal space configured to receive the at least one hollow fiber type membrane;
      at least one hole configured to pass a first stream of a fluid, in contact with an external part of the at least one hollow fiber type membrane, from the internal space to an outside of the vessel body;
      at least one channel configured to receive a sealing ring, the sealing ring configured to be compressed by the head while the sealing ring is in the at least one channel, and
   wherein the head comprises:
      an eccentric connector communicatively connected to the internal space of the vessel body via the at least one hole of the vessel body, the eccentric connector configured as an inlet or an outlet of the first stream of the fluid; and
      a central connector communicatively connected to the internal space of the vessel body, the central connector configured as an inlet or an outlet of a second stream of the fluid that circulates through a lumen of the at least one hollow fiber type membrane.

2. The high-pressure vessel of claim 1, wherein the head comprises threads or a flange, wherein the threads or the flange are configured to connect the head to the vessel body.

3. The high-pressure vessel of claim 2, wherein the head comprises the threads, and a diameter of the internal space is equal to or less than 1 inch.

4. The high-pressure vessel of claim 3, wherein the at least one channel comprises a plurality of annular channels that are configured to receive sealing rings, respectively.

5. The high-pressure vessel of claim 2, wherein the head comprises the flange, and a diameter of the internal space is greater than 1 inch.

6. The high-pressure vessel of claim 5, wherein the at least one channel comprises a plurality of annular channels that are configured to receive first sealing rings, respectively, and
   wherein the head further comprises an annular channel configured to receive a second sealing ring.

7. The high-pressure vessel of claim 1, wherein the sealing ring is an O-ring or a gasket-type sealing ring.

8. The high-pressure vessel of claim 1, wherein the high-pressure vessel is configured to perform a liquid-liquid, liquid-gas, or gas-gas type of separation.

9. The high-pressure vessel of claim 8, wherein the high-pressure vessel is configured to remove CO2 from a stream of natural gas, or is configured to be a liquid-liquid type for membrane distillation processes, or is configured for direct osmosis permeation or power generation.

* * * * *